(12) United States Patent
Raghavan et al.

(10) Patent No.: US 12,481,637 B2
(45) Date of Patent: Nov. 25, 2025

(54) SYSTEMS AND METHODS FOR MULTI-BRAND EXPERIENCE IN ENTERPRISE COMPUTING ENVIRONMENT

(71) Applicant: OPEN TEXT SA ULC, Halifax (CA)

(72) Inventors: Srikanth Raghavan, Ashburn, VA (US); Richard Guildford Hellier, Jr., Catawba, VA (US); Kathy DiBella, Milford, NH (US); Michael Scott, Washington Grove, MD (US); Andrew Chillrud, Saratoga Springs, NY (US)

(73) Assignee: OPEN TEXT SA ULC, Halifax (CA)

( * ) Notice: Subject to any disclaimer, the term of this patent is extended or adjusted under 35 U.S.C. 154(b) by 30 days.

(21) Appl. No.: 17/959,002

(22) Filed: Oct. 3, 2022

(65) Prior Publication Data

US 2023/0021630 A1    Jan. 26, 2023

Related U.S. Application Data

(63) Continuation of application No. 17/322,782, filed on May 17, 2021, now Pat. No. 11,500,846, which is a (Continued)

(51) Int. Cl.
| | | |
|---|---|---|
| G06F 16/21 | (2019.01) | |
| G06F 3/0482 | (2013.01) | |
| G06F 3/04847 | (2022.01) | |
| G06F 3/0486 | (2013.01) | |
| G06F 16/18 | (2019.01) | |
| G06F 16/22 | (2019.01) | |
| G06F 16/23 | (2019.01) | |
| G06F 16/25 | (2019.01) | |
| G06F 16/3332 | (2025.01) | |

(Continued)

(52) U.S. Cl.
CPC ........ *G06F 16/2343* (2019.01); *G06F 3/0482* (2013.01); *G06F 3/04847* (2013.01); *G06F 3/0486* (2013.01); *G06F 16/1873* (2019.01); *G06F 16/211* (2019.01); *G06F 16/219* (2019.01); *G06F 16/22* (2019.01); *G06F 16/2329* (2019.01); *G06F 16/25* (2019.01); *G06F 16/3337* (2019.01); *G06F 40/177* (2020.01); *G06F 40/58* (2020.01); *H04L 63/08* (2013.01)

(58) Field of Classification Search
CPC ..... G06F 3/0482; G06F 3/04847; H04L 63/08
See application file for complete search history.

(56) References Cited

U.S. PATENT DOCUMENTS

| 7,310,677 B1 * | 12/2007 | Cohen | G06F 16/954 |
| | | | 709/227 |
| 2003/0115292 A1 * | 6/2003 | Griffin | H04L 69/329 |
| | | | 709/219 |

(Continued)

*Primary Examiner* — Rinna Yi
(74) *Attorney, Agent, or Firm* — SPRINKLE IP LAW GROUP

(57) ABSTRACT

A system provides a mechanism for providing a multi-brand experience. The system provides a way implement a multi-brand experience by adding a layer of information that can be helpful when differentiating among consumers in order to accomplish market segmentation. The multi-brand experience enables each group of users to be presented with a different look and feel of the same application.

22 Claims, 5 Drawing Sheets

Related U.S. Application Data continuation of application No. 15/365,286, filed on Nov. 30, 2016, now Pat. No. 11,030,181.

(60) Provisional application No. 62/261,162, filed on Nov. 30, 2015.

(51) Int. Cl.
*G06F 40/177* (2020.01)
*G06F 40/58* (2020.01)
*H04L 9/40* (2022.01)

(56) References Cited

U.S. PATENT DOCUMENTS

| | | | | |
|---|---|---|---|---|
| 2004/0003347 A1* | 1/2004 | Saidenberg | ............ | G06Q 30/06 |
| | | | | 715/255 |
| 2005/0075544 A1* | 4/2005 | Shapiro | ................. | G16H 10/60 |
| | | | | 600/300 |
| 2013/0111562 A1* | 5/2013 | Lee | .................... | G06F 21/6218 |
| | | | | 726/4 |
| 2014/0344110 A1* | 11/2014 | Underwood | ........ | G06F 3/04842 |
| | | | | 705/26.1 |

* cited by examiner

FIG. 3

SYSTEMS AND METHODS FOR MULTI-BRAND EXPERIENCE IN ENTERPRISE COMPUTING ENVIRONMENT

CROSS-REFERENCE TO RELATED APPLICATIONS

This application is a continuation of, and claims a benefit of priority under 35 U.S.C. § 120 from, U.S. patent application Ser. No. 17/322,782, filed May 17, 2021, issued as U.S. Pat. No. 11,500,846, entitled "SYSTEMS AND METHODS FOR MULTI-BRAND EXPERIENCE IN ENTERPRISE COMPUTING ENVIRONMENT," which is a continuation of, and claims a benefit of priority under 35 U.S.C. § 120 from, U.S. patent application Ser. No. 15/365,286, filed Nov. 30, 2016, issued as U.S. Pat. No. 11,030,181, entitled "SYSTEMS AND METHODS FOR MULTI-BRAND EXPERIENCE IN ENTERPRISE COMPUTING ENVIRONMENT," which is claims a benefit of priority under 35 U.S.C. § 119(e) from U.S. Provisional Application No. 62/261,162, filed Nov. 30, 2015, entitled "SYSTEMS AND METHODS FOR MULTILINGUAL METADATA, MULTI-FILE CHECK-IN, AND MULTI-BRAND EXPERIENCE." All applications listed in this paragraph are hereby expressly incorporated by reference herein for all purposes.

TECHNICAL FIELD

This disclosure relates generally to content management, including digital asset management, multimedia management, etc. More particularly, embodiments disclosed herein relate to systems, methods, and computer program products for multi-brand experience features useful for content management.

BACKGROUND OF THE RELATED ART

Frequently, multiple companies, or multiple divisions of the same company use the same application to interface with clients, customers, employees, etc. Often, the company wants to give the application a unique look and feel, such as using a customized background, using company logos, using customized colors, etc. However, customizing all of these features of an application can be difficult and cumbersome.

SUMMARY OF THE DISCLOSURE

An object of this disclosure is to provide a new feature function for multi-brand experience within the same instance of a media management system (MMS). This new feature function can provide different users with completely different user experiences in interacting with the MMS without requiring separate portals, while allowing different branding to be created in the same MMS instance. In some embodiments, custom branding can be rendered for groups accessing the same MMS instance such that each group can experience totally different look and feel of the same MMS instance. For example, a creative group, a marketing group, external agencies, etc. access the same "Brand Central" site may each get a totally different look and feel of the site. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 3 depicts a screenshot representation of a media management user interface, illustrating a brand configuration screen or page.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, embodiments disclosed herein relate to systems, methods, and computer program products for multi-brand experience features useful for content management, media management, and the like. The disclosure describes ways of implementing a multi brand experience by adding a layer of information that can be helpful when differentiating among consumers in order to accomplish market segmentation. Each group of users can be presented with a different look and feel of the same application. Through the use of the branding infrastructure, it is possible to brand a media manager on a per-user basis.

Figure 1:
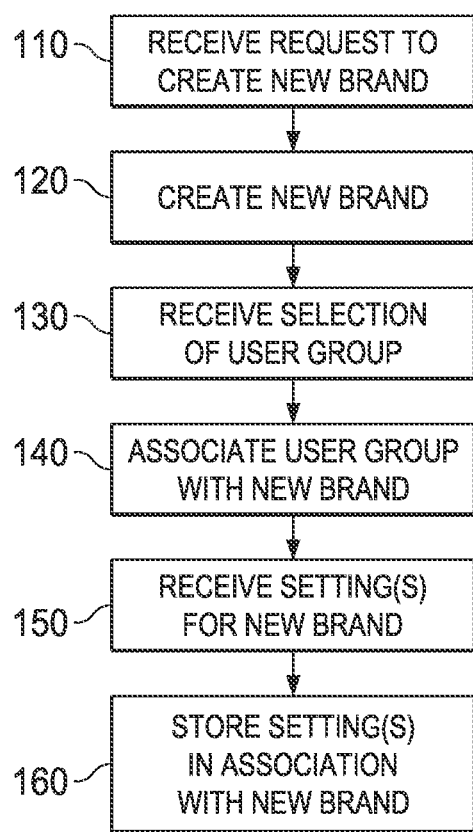
FIG. 1 depicts a flow chart illustrating an example of a method for providing a multi-brand experience in a media management system.

FIG. 1 (described below) is a flow chart illustrating an example of a method for providing a multi-brand experience in a content management system or a media management system. In some embodiments, the method may comprise receiving a request to create a new brand; creating the new brand, wherein the new brand comprises settings defining a look and feel of the content management system; receiving a selection of a user group to associate with the new brand; associating the user group with the new brand; receiving a selection of one or more settings for the new brand; and storing the selection of one or more settings.

Figure 2:
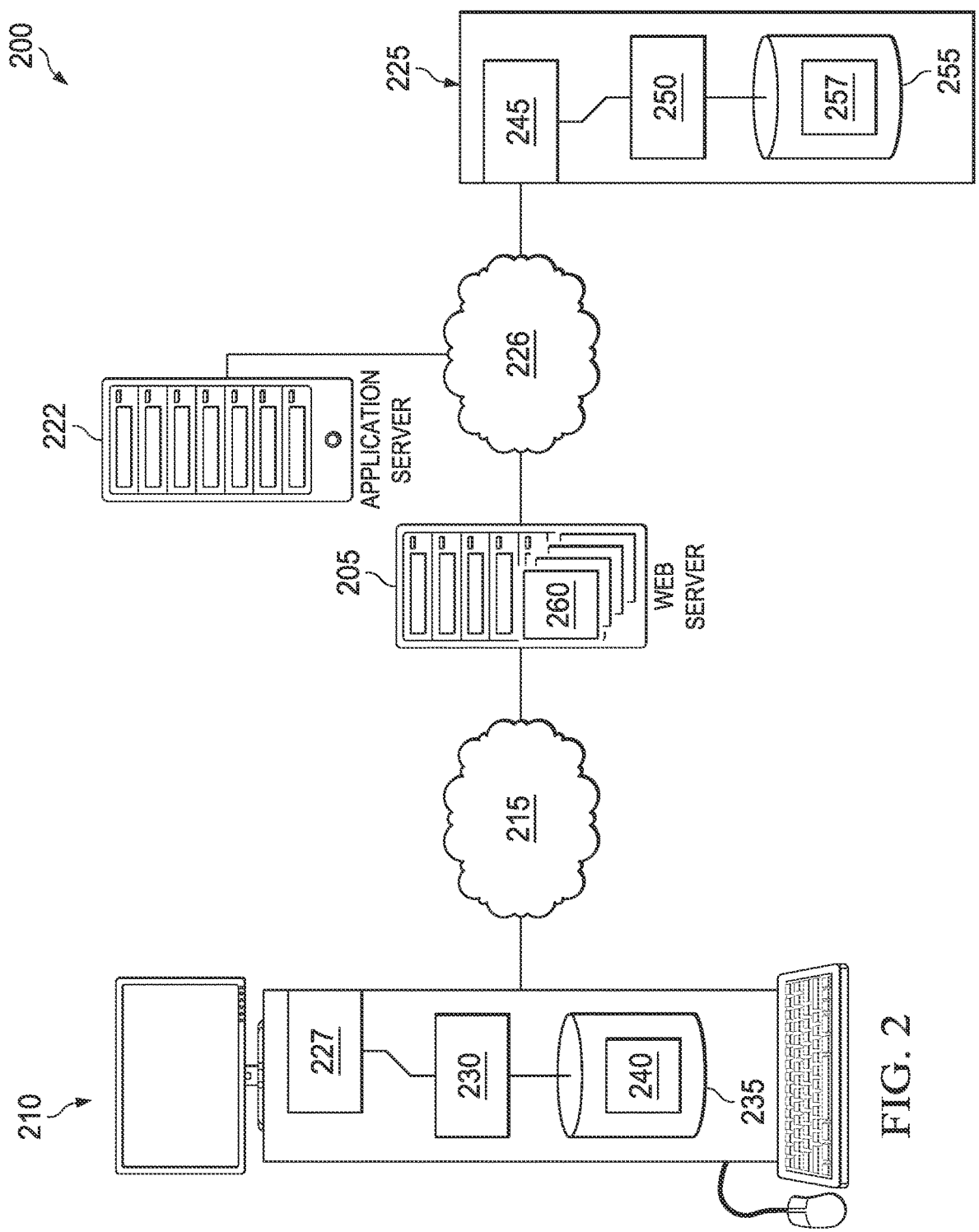
FIG. 2 depicts an exemplary enterprise computing environment where embodiments disclosed herein may be implemented.

FIG. 2 depicts a diagrammatic representation of enterprise computing environment 200 where embodiments disclosed herein may be implemented. In FIG. 2, web server 205 is communicatively connected to client computer 210 via network 215, which can be a global computer network such as the Internet, a local area network (LAN), a wide area network (WAN), a wireless network or any computer network known in the art. Web server 205 can also be communicatively connected to additional servers, such as, for example, application server 222 and content/media management system (CMS or MMS) 225 via, for example, second network 226 (e.g., a LAN).

Client computer 210 can include network interface 227 (e.g., an internal or external modem, Ethernet adapter or other network interface device known in the art) to connect to and interface with network 215, processor 230 and non-transitory computer readable storage medium 235 (e.g., random access memory (RAM), read-only memory (ROM), optical storage medium, magnetic storage medium or any other computer readable memory known in the art). Additionally, client computer 210 can include one or more input devices (e.g., keyboard, mouse, voice activated input or other input device known in the art) and one or more displays. Computer readable storage medium 235 can store browser program 240 that can be executable by processor 230 to allow a user, through the use of the input and display devices, to request and view web pages over network 215. Examples of browser programs include Netscape Navigator™, (Netscape and Netscape Navigator are trademarks of Netscape Communications Corporation of Mountain View, Calif.) and Microsoft Internet Explorer™ (Microsoft and Microsoft Internet Explorer are trademarks of Redmond Wash. based Microsoft Corporation).

Likewise, CMS 225 can include a network interface 245 (e.g., an internal or external modem, Ethernet adapter or other network interface device known in the art) to connect to and interface with network 226, processor 250 and non-transitory computer readable storage medium 255 (e.g., RAM, ROM, optical storage medium, magnetic storage medium or any other computer readable memory known in the art). Computer readable storage medium 255 can store computer instructions 257 executable by processor 250 to perform one or more feature functions disclosed herein.

Although not shown for clarity, each of web server 205 and application server 222 can include computer components such as network interfaces, memories, processors, and other computer components and software known in the art. Web server 205 can host web site 260 that can comprise one or more web pages. A user, via browser program 240, can generate a request, such as an HTTP GET request for a web page hosted by web server 205. Web server 205 can retrieve the web page and communicate the web page to browser 240 for review by a user. Included in the web page can be text, graphics, audio content and video content. Additionally, each of web server 205 and application server 222 can contain software applications that can communicate with CMS 225 at the backend.

An enterprise may use CMS 225 to store, organize, find, retrieve, and share managed objects. Managed objects may include, for example, media files or digital media. Each managed object may have metadata associated therewith that describe the particular managed object. Metadata may include various fields, such as author's name, description of the file, etc. and may be useful in cataloging and searching managed objects. A search application may use the information contained in the metadata of a managed object when searching for managed objects.

Skilled artisans appreciate that CMS 225 is representative of many types of information management systems, including those that provide digital media management. Digital media refers to any media that are encoded in a machine-readable format. Objects managed by CMS 225 can include many types of digital media, for instance, computer programs, text, images, audio, videos, games, web pages, web sites, databases, etc. Digital media can be created, viewed, distributed, modified, and preserved on computers and often have rich metadata associated therewith. For example, an image of a company's product may have metadata such as a product description, a photographer, etc. associated with the image. These descriptions may be comprised of strings of text. A user wishing to search for digital media may initiate a search. A search application may utilize the text strings in the metadata and return search results to the user.

As described above, FIG. 1 is a flow chart illustrating an example of a method for providing a multi-brand experience in a content management system or a media management system. In some embodiments, the method begins with step 110, where a request to create a new brand is received. In response to the request, a new brand is created at step 120, wherein the new brand comprises settings defining a look and feel of the system. At step 130, a selection of a user group to associate with the new brand is received. At step 140, the user group is associated with the new brand. At step 150, a selection of one or more settings for the new brand is received. At step 160, the selection of one or more settings is stored.

In some embodiments, the method may further comprise presenting a login or portal to a user on a client device; receiving login information from the user; determining a user group associated with the user; and rendering a user interface based on a brand associated with the user group associated with the user. In some embodiments, the settings may be loaded post-login.

In this disclosure, a brand may refer to a selection of settings for a system (e.g., a content management system, a media management system, an asset management system, a multimedia management system, a document management system, or the like), including the look, feel, and/or function of a user interface of the system. Brands may be loaded post-login and may include customizations and integrations of system components. To implement software specially tailored to separate groups under current systems, software program may need to be installed as a separate instance for each group. The multi-brand experience feature function may be useful, for example, for a company that owns multiple other companies (i.e. subsidiaries), each offering goods or services under its own brand name. The multi-brand experience feature function may also be useful for a company that has several different groups, such as creative group, marketing, external agencies, etc. Installing multiple instances of a complex software system such as a multimedia management system may prove costly. Therefore, it would be advantageous to implement one instance of a system that can be tailored for use by multiple users.

In some embodiments, the system may be configurable, via a multi-brand experience feature function, to provide a user interface (UI) unique to users from different subsidiaries or groups while only requiring a single instance of the system.

In some embodiments, a single instance of a system, such as a media management system, may be accessible by users from different subsidiaries or groups. Regardless of affiliation, every user is directed to a single entry point or portal. When the user logs in, the UI is rendered according to the user's affiliation. The multi-brand experience feature function is configurable to give each group a totally different look and feel, similar to a user interface "theme." The multi-brand experience feature function may display, for example, different text, fonts, colors, images, folders, etc. for various groups within a company. The ability to customize the UI allows a personalized branded experience of the application based on the user's organizational affiliation using a single instance of the software program and portal.

In some embodiments, a system may receive, from a user or administrator, a request to create a new brand. The system may operate to create the new brand. The system may receive details about the new brand, such as name, description, folder name, etc. The user or administrator may assign a brand to a user group in the system.

The user or administrator may then configure the UI for the brand. Configuration of the UI may involve customizations and integrations, such as selecting logos, sub-logos, fonts, colors, backgrounds, or application features to be displayed to users associated with the brand. The UI may also be configured for specific styles, templates, additional menu entries, ordering of menu entries, or the like. Configuring the UI for the brand may be referred to as "re-theming." The system may then store the configuration.

A user wishing to log in to the system from a client device may direct his or her browser to the system login page. All users of the system may be sent to the same portal regardless of affiliation. When the user logs in, the system renders the UI according to the brand settings based on the user's group affiliation. The customizations and integrations of the brand may be loaded post-login.

An administrator may also import branding helpers into a brand. Branding helpers are configured to streamline the process of re-theming an application. Branding helpers may, for example, include helpers for setting the home screen background, setting the logo, and setting the color scheme, etc.

Following is a description of one example of creating a new brand. In this example, a user or administrator wishing to create a new brand may perform the following actions. First, the user creates a new folder for the brand being created. Inside the new folder, the user creates a file, for example, called "branding.html." This file serves the same purpose as "include.html" does for a typical customization and integration, and can be used in the same fashion.

Figure 3:
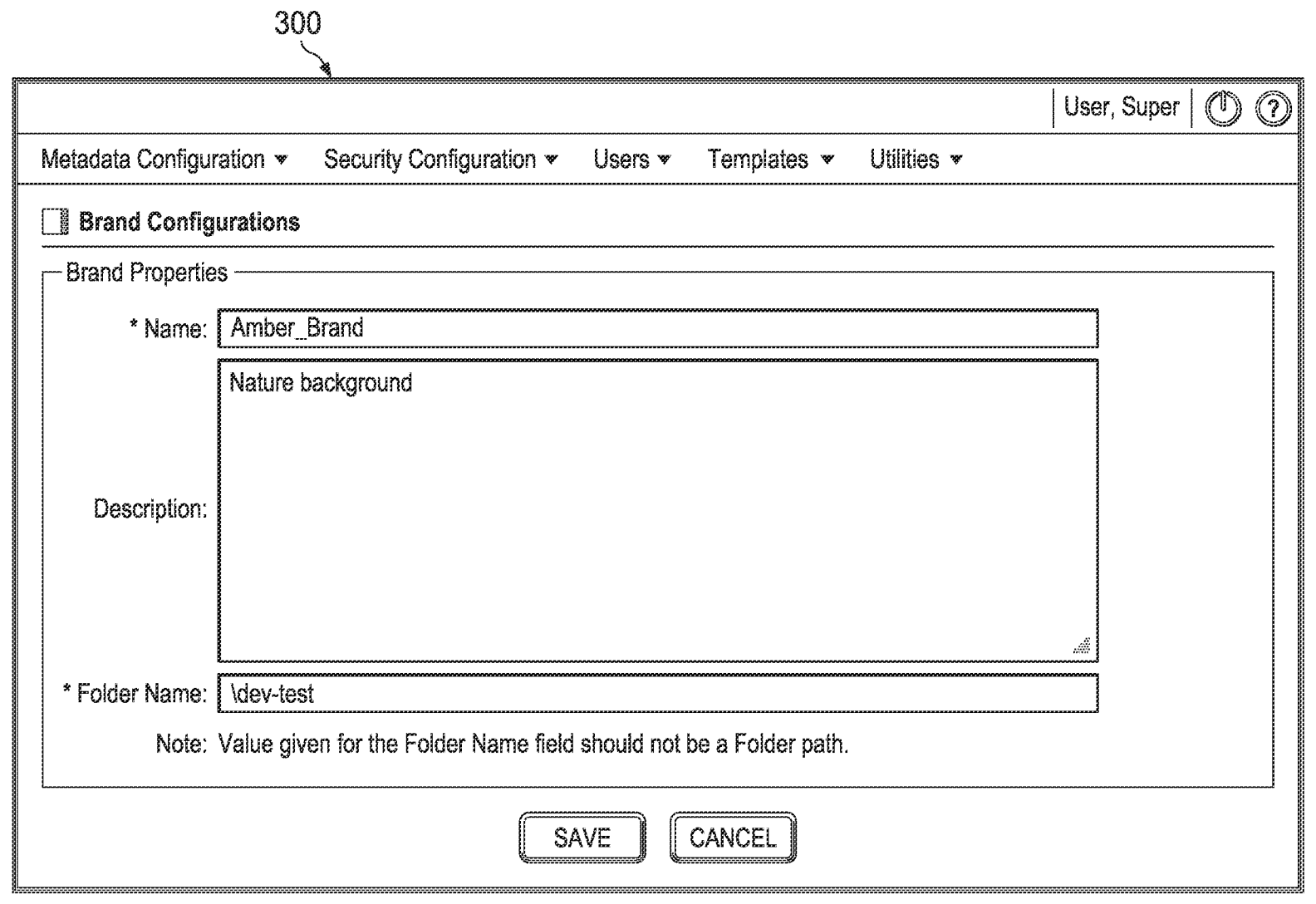

As an example, via a media management administration web client, the user may select "Templates>Brand Configurations" to create a new brand configuration. The user enters a name and description and sets the folder property to the name of the folder that was created for this brand in the first step above. FIG. 3 depicts a screenshot representation of a media management user interface 300, illustrating a "Brand Configurations" screen or page, where the user can enter a brand name, description, folder name, etc.

Figure 4:
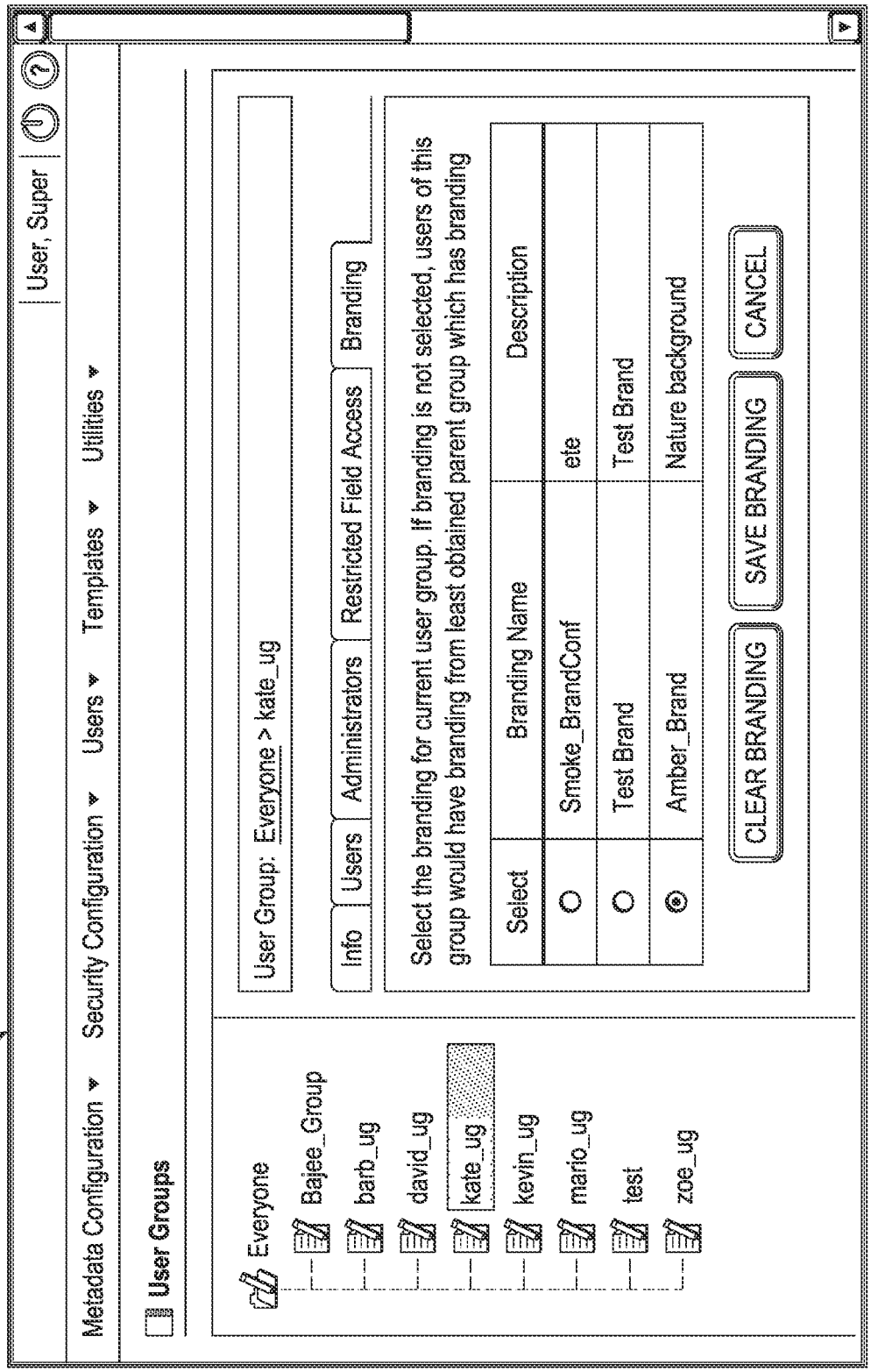
FIG. 4 depicts a screenshot representation of a media management user interface, illustrating a user groups screen or page.

In the example media management administration web client, the user may select "Users>User Groups" and assign the brand to a user group by selecting a user group, navigating to the "Branding" tab and adding some brands to the user group. FIG. 4 depicts a screenshot representation of a media management user interface 400, illustrating a "User Groups" screen or page. On this page, the user can select a user group, and configure various properties of the group. For example, FIG. 4 show that the "Branding" tab is selected and the user can add brand(s) to the selected user group via the "Branding" tab.

Figure 5:
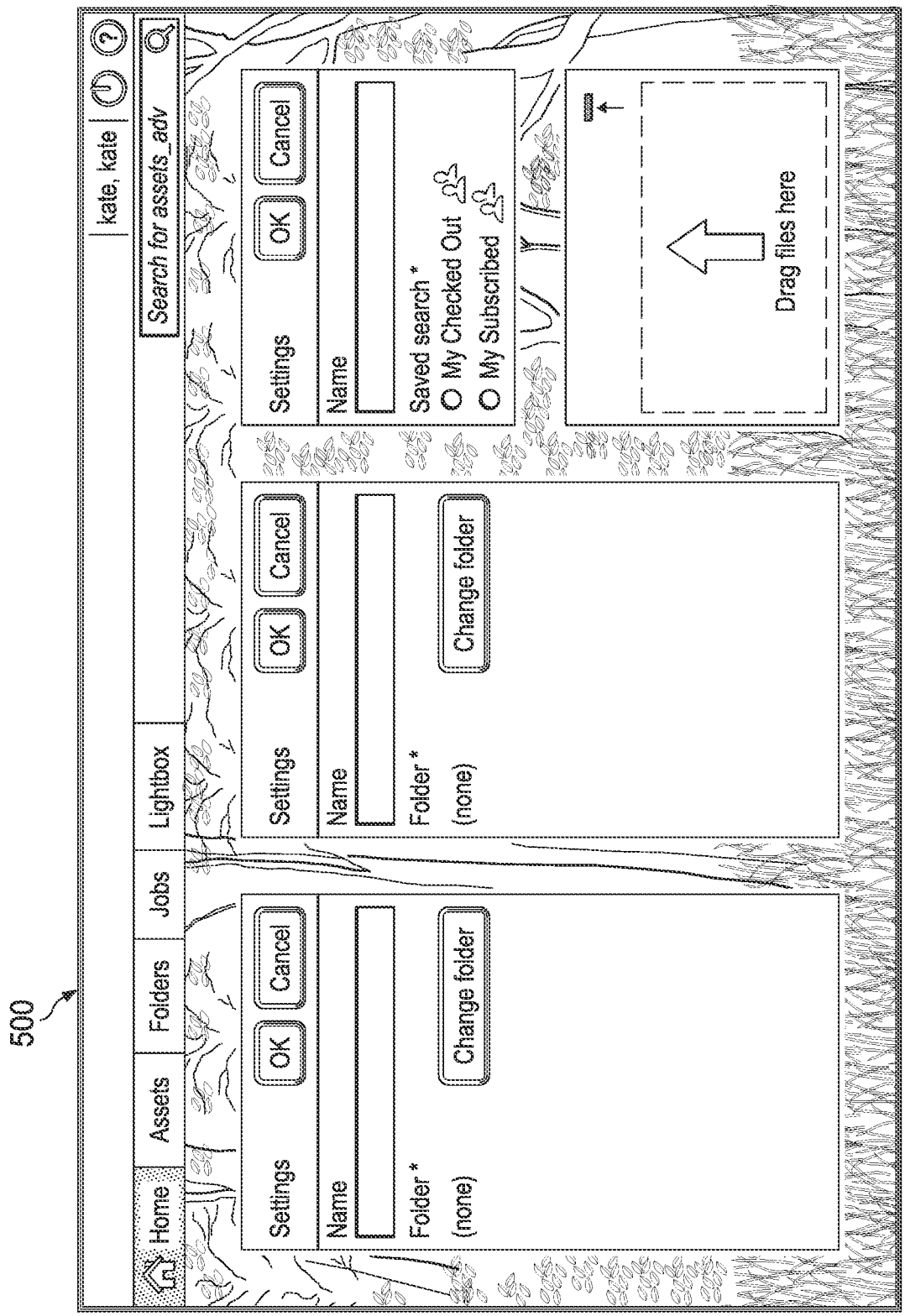
FIG. 5 depicts a screenshot representation of a media management user interface, illustrating a brand with an updated home screen background, logo, and color scheme shown for a user.

In the media management administration web client, a user that is a member of the user group assigned to the brand in the example above can sign into media manager and go into "General Preferences" and in the "Brand" option, select the newly created brand and save the preferences. Then, when the browser is refreshed, or the next time the user signs into the media manager with that user, the "branding.html" created earlier will now be loaded for that user. FIG. 5 depicts a screenshot representation of a media management user interface 500, illustrating a brand with an updated home screen background, logo, and color scheme shown for the user selected above.

In some embodiments, with branding, anything that would work with an integration, such as changing styles or templates, adding new menu entries, re-ordering menu entries, and so forth, can also work in a branding file, with a few exceptions. There can also be some additional "branding helpers" available which can streamline the process of re-theming an application.

In some embodiments, a user wishing to use the branding helpers may need to "import" them into a brand. In some embodiments, importing branding helpers into a brand may include: (1) creating a ".less" file in the branding, and referencing it in the "branding.html" file, described above; and (2) in the ".less" file created in the previous step, include the following line at the top of the file—@import (reference) " . . . /brand-functions.less." In this example, after following these steps, the branding helpers will be available.

A user wishing to use the branding helpers described above may use them in the ".less" file similar to the way a function would be called in Javascript. Some examples of some of the functions include setting the home screen background, setting a logo(s), setting a color scheme, etc. Other examples are also possible, as one skilled in the art would understand.

Note that, unlike typical customizations and integrations, brands can be loaded post-login as opposed to pre-login. This means that all functionality that is available for integrations, such as adding new menu entries or changing images and so forth, can also be used for branding.

Additional details and examples on media management including searching metadata can be found in U.S. Pat. No. 9,348,890, entitled "SYSTEM AND METHOD OF SEARCH INDEXES USING KEY-VALUE ATTRIBUTES TO SEARCHABLE METADATA," which is fully incorporated by reference herein.

These, and other, aspects of the disclosure and various features and advantageous details thereof are explained more fully with reference to the exemplary, and therefore non-limiting, embodiments illustrated and detailed below. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved using distributed, or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for multi-brand experience in an enterprise computing environment, the method comprising:

starting, on a server machine operating at a backend of the enterprise computing environment, an instance of an application;

receiving, by the instance of the application, requests to create a first new brand and a second new brand;

creating, by the instance of the application, the first new brand and the second new brand, wherein the first new brand comprises a first set of settings of the application, the first set of settings defining a first look and feel of the application, including a first application feature, and wherein the second new brand comprises a second set of settings of the application, the second set of settings defining a second look and feel of the application, including a second application feature;

receiving, by the instance of the application, information on a first user group for the first new brand and information on a second user group for the second new brand;

associating, by the instance of the application, the first user group with the first new brand and the second user group with the second new brand;

receiving, by the instance of the application, a selection of one or more settings for the user group associated with the new brands, wherein the one or more settings includes adding some brands from a list of brands to the user groups;

receiving, by the instance of the application through a web page hosted on a web server, login information from a plurality of users, the web server communicatively connected to the plurality of users over the Internet, the web page representing a single entry point or portal for the application running at the backend of the enterprise computing environment regardless of group membership of the plurality of users; and loading, by the instance of the application after logging in the plurality of users through the single entry point or portal for the application on a display device, the first new brand and the second new brand via different user interfaces of the application such that through the first new brand and the second new brand, the first user group and the second user group experience different looks and feels, including different application features, of the same application, wherein customizations and integrations of the first new brand and of the second new brand with the different user interfaces of the application are loaded post-login.

2. The method according to claim 1, further comprising:
determining a respective user group associated with each respective user of the plurality of users, the plurality of users including a first user associated with the first user group and a second user associated with the second user group; and rendering the different user interfaces of the application, the rendering comprising:
rendering a first user interface with the first look and feel of the application for the first user based on the first new brand associated with the first user group associated with the first user; and
rendering a second user interface with the second look and feel of the application for the second user based on the second new brand associated with the second user group associated with the second user.

3. The method according to claim 2, wherein the rendering the first user interface with the first look and feel of the application comprises loading the first set of settings defining the first look and feel of the application and wherein the rendering the second user interface with the second look and feel of the application comprises loading the second set of settings defining the second look and feel of the application.

4. The method according to claim 1, further comprising:
receiving a customization for the first new brand, the customization including a selection of one or more of the first set of settings for the first look and feel of the application; and
storing the selection of the one or more of the first set of settings for the first look and feel of the application in a storage medium.

5. The method according to claim 1, wherein the application is configured for communicating with the web server over a local area network in the enterprise computing environment.

6. The method according to claim 1, wherein the application is configured for managing objects in the enterprise computing environment.

7. The method according to claim 1, wherein the application comprises a content management system, a media management system, a digital media management system, an asset management system, a multimedia management system, or a document management system.

8. The method according to claim 1, wherein the creating of the first new brand and the second new brand further comprises defining customizable settings specific to each brand, wherein the customizable settings comprise color schemes, logos, fonts, and ordering of menu entries.

9. The method of claim 8, wherein the different looks and feels are defined by the customizable settings for the respective brands and the different application features.

10. An information management system (IMS) for multi-brand experience in an enterprise computing environment, the IMS comprising:
a processor;
a non-transitory computer-readable medium; and
instructions stored on the non-transitory computer-readable medium and translatable by the processor for:
starting, on a server machine operating at a backend of the enterprise computing environment, an instance of an application;
receiving requests to create a first new brand and a second new brand;
creating the first new brand and the second new brand, wherein the first new brand comprises a first set of settings of the application, the first set of settings defining a first look and feel of the application, including a first application feature, and wherein the second new brand comprises a second set of settings of the application, the second set of settings defining a second look and feel of the application, including a second application feature;
receiving information on a first user group for the first new brand and information on a second user group for the second new brand;
associating the first user group with the first new brand and the second user group with the second new brand;
receiving, by the instance of the application, a selection of one or more settings for the user group associated with the new brands, wherein the one or more settings includes adding some brands from a list of brands to the user groups;
receiving, through a web page hosted on a web server, login information from a plurality of users, the web server communicatively connected to the plurality of users over the Internet, the web page representing a single entry point or portal for the application running at the backend of the enterprise computing environment regardless of group membership of the plurality of users; and
loading, after logging in the plurality of users through the single entry point or portal for the application on a display device, the first new brand and the second new brand via different user interfaces of the application such that through the first new brand and the second new brand, the first user group and the second user group experience different looks and feels, including different application features, of the same application, wherein customizations and integrations of the first new brand and of the second new brand with the different user interfaces of the application are loaded post-login.

11. The IMS of claim 10, wherein the instructions are further translatable by the processor for:
determining a respective user group associated with each respective user of the plurality of users, the plurality of users including a first user associated with the first user group and a second user associated with the second user group; and
rendering the different user interfaces of the application, the rendering comprising:
rendering a first user interface with the first look and feel of the application for the first user based on the first new brand associated with the first user group associated with the first user; and
rendering a second user interface with the second look and feel of the application for the second user based on the second new brand associated with the second user group associated with the second user.

12. The IMS of claim 11, wherein the rendering the first user interface with the first look and feel of the application comprises loading the first set of settings defining the first look and feel of the application and wherein the rendering the second user interface with the second look and feel of the application comprises loading the second set of settings defining the second look and feel of the application.

13. The IMS of claim 10, wherein the instructions are further translatable by the processor for:
receiving a customization for the first new brand, the customization including a selection of one or more of the first set of settings for the first look and feel of the application; and
storing the selection of the one or more of the first set of settings for the first look and feel of the application in a storage medium.

14. The IMS of claim 10, wherein the application is configured for communicating with the web server over a local area network in the enterprise computing environment.

15. The IMS of claim 10, wherein the application is configured for managing objects in the enterprise computing environment.

16. The IMS of claim 10, wherein the application comprises a content management system, a media management system, a digital media management system, an asset management system, a multimedia management system, or a document management system.

17. A computer program product comprising a non-transitory computer-readable medium storing instructions translatable by a processor for:
starting, on a server machine operating at a backend of an enterprise computing environment, an instance of an application;
receiving requests to create a first new brand and a second new brand;
creating the first new brand and the second new brand, wherein the first new brand comprises a first set of settings of the application, the first set of settings defining a first look and feel of the application, including a first application feature, and wherein the second new brand comprises a second set of settings of the application, the second set of settings defining a second look and feel of the application, including a second application feature;
receiving information on a first user group for the first new brand and information on a second user group for the second new brand;
associating the first user group with the first new brand and the second user group with the second new brand;
receiving, by the instance of the application, a selection of one or more settings for the user group associated with the new brands, wherein the one or more settings includes adding some brands from a list of brands to the user groups;
receiving, through a web page hosted on a web server, login information from a plurality of users, the web server communicatively connected to the plurality of users over the Internet, the web page representing a single entry point or portal for the application running at the backend of the enterprise computing environment regardless of group membership of the plurality of users; and
loading, after logging in the plurality of users through the single entry point or portal for the application on a display device, the first new brand and the second new brand via different user interfaces of the application such that through the first new brand and the second new brand, the first user group and the second user group experience different looks and feels, including different application features, of the same application, wherein customizations and integrations of the first new brand and of the second new brand with the different user interfaces of the application are loaded post-login.

18. The computer program product of claim 17, wherein the instructions are further translatable by the processor for:
determining a respective user group associated with each respective user of the plurality of users, the plurality of users including a first user associated with the first user group and a second user associated with the second user group; and
rendering the different user interfaces of the application, the rendering comprising:
rendering a first user interface with the first look and feel of the application for the first user based on the first new brand associated with the first user group associated with the first user; and
rendering a second user interface with the second look and feel of the application for the second user based on the second new brand associated with the second user group associated with the second user.

19. The computer program product of claim 18, wherein the rendering the first user interface with the first look and feel of the application comprises loading the first set of settings defining the first look and feel of the application and wherein the rendering the second user interface with the second look and feel of the application comprises loading the second set of settings defining the second look and feel of the application.

20. The computer program product of claim 17, wherein the instructions are further translatable by the processor for:
receiving a customization for the first new brand, the customization including a selection of one or more of the first set of settings for the first look and feel of the application; and
storing the selection of the one or more of the first set of settings for the first look and feel of the application in a storage medium.

21. The computer program product of claim 17, wherein the application is configured for communicating with the web server over a local area network in the enterprise computing environment.

22. The computer program product of claim 17, wherein the application is configured for managing objects in the enterprise computing environment.

* * * * *